Figure 1:
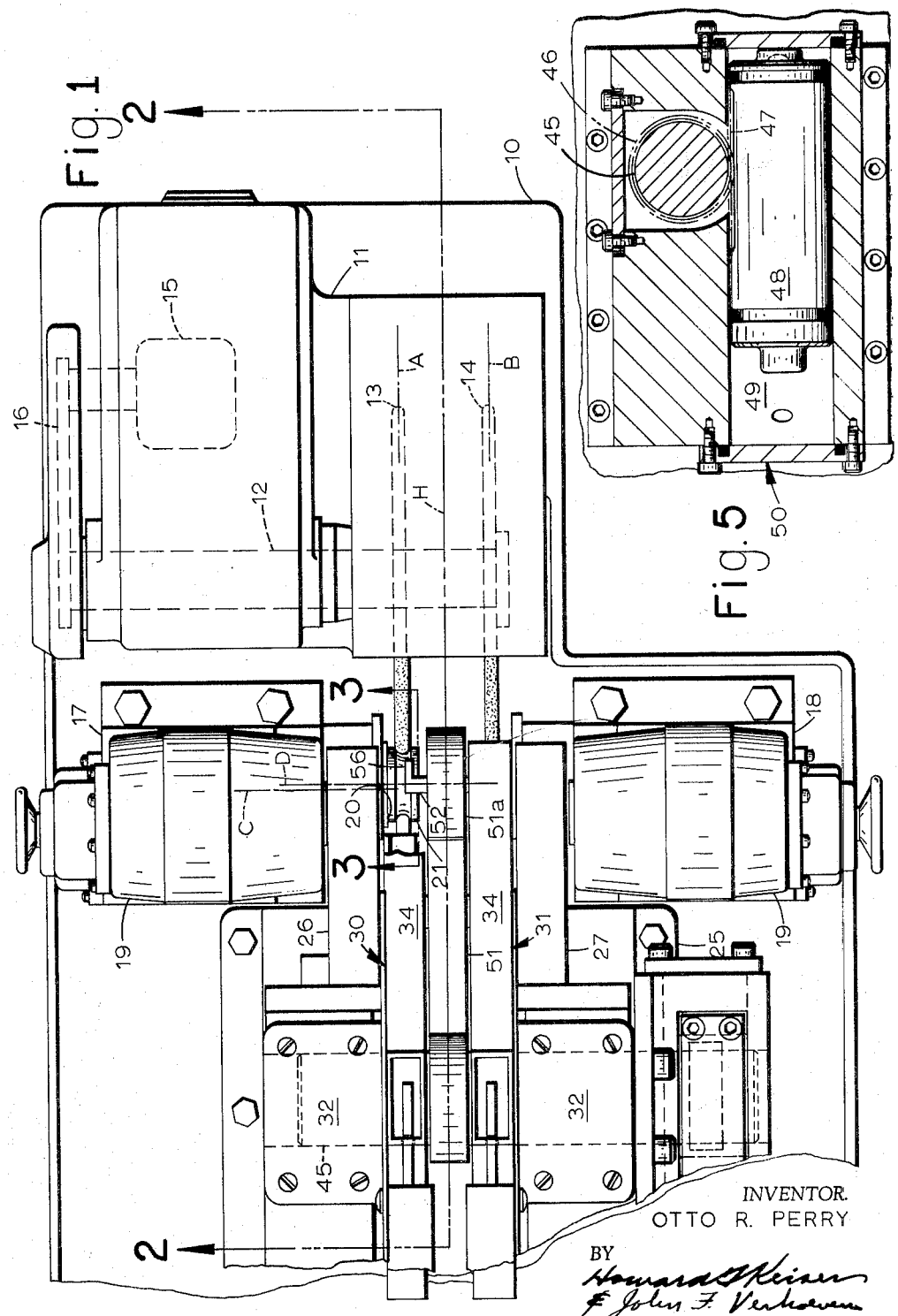

March 15, 1966  O. R. PERRY  3,239,969
SINGLE ARM DOUBLE WORKPIECE LOADER FOR MACHINE TOOL
Filed Oct. 28, 1963  3 Sheets-Sheet 1

INVENTOR.
OTTO R. PERRY
BY
Howard G. Keiser
John F. Verhoeven
ATTORNEYS

March 15, 1966  O. R. PERRY  3,239,969
SINGLE ARM DOUBLE WORKPIECE LOADER FOR MACHINE TOOL
Filed Oct. 28, 1963  3 Sheets-Sheet 2

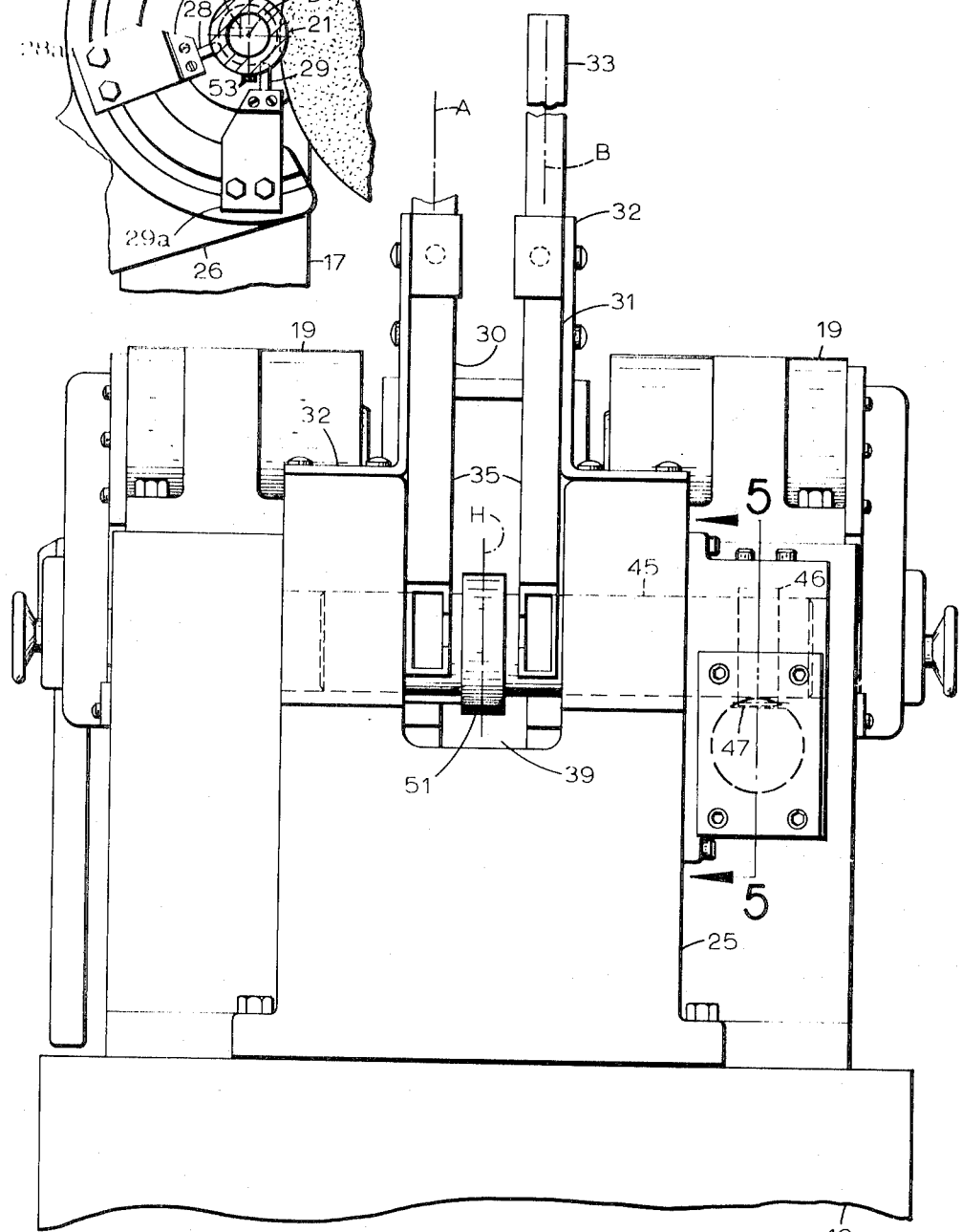

United States Patent Office 3,239,969
Patented Mar. 15, 1966

3,239,969
SINGLE ARM DOUBLE WORKPIECE LOADER
FOR MACHINE TOOL
Otto R. Perry, Cincinnati, Ohio, assignor to The Cincinnati Milling Machine Co., Cincinnati, Ohio, a corporation of Ohio
Filed Oct. 28, 1963, Ser. No. 319,382
7 Claims. (Cl. 51—215)

The present invention relates to a workpiece loading mechanism for a machine tool, and, more particularly, to a workpiece loader having a single arm capable of loading two workpieces simultaneously.

One method of increasing the capacity of a machine tool is to provide mechanism for the simultaneous operation on two workpieces instead of on one workpiece only. Little is gained, however, if the cost of the machine tool is doubled, or nearly doubled, since it would then be as economical to have two machines, each producing finished workpieces one at a time, as to have a single machine producing workpieces two at a time.

The problem of loading and unloading a machine for simultaneous operation on two workpieces is not only rendered difficult by the fact that two workpieces must be loaded simultaneously, but also by the fact that, generally, the two workpieces must be loaded into closely spaced operating stations. If two loading arms are used, each to load a single workpiece, the cost of the loading mechanism will be almost twice the cost of loading mechanism on a machine capable of producing only one workpiece at a time, and some of the economic advantage of a dual operating machine will be lost.

In the present invention there is provided a loader for simultaneously loading two workpieces into closely spaced operating zones in which a single arm, mounted to swing in a plane extending between said operating zones, carries workpieces on each side of the arm into the respective operating stations. In the preferred form of the invention, the same arm simultaneously unloads the two workpieces after the machining operation thereon. With the preferred construction of the present invention, the arm holds the two discharged workpieces momentarily to provide a guide support for two unoperated workpieces being loaded.

It is therefore one object of the present invention to provide a loading mechanism to insert two workpieces simultaneously into a machine tool, which loading mechanism is not significantly more complicated than a loading mechanism for loading workpieces one at a time.

It is another object of the present invention to provide a mechanism having a single arm capable of loading two unoperated workpieces simultaneously into a machine tool and simultaneously removing the workpieces therefrom after the operation thereon.

It is yet another object of the present invention to provide a mechanism for loading two workpieces simultaneously and unloading the workpieces in which the unloaded workpieces support two workpieces during the loading operation.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 2:
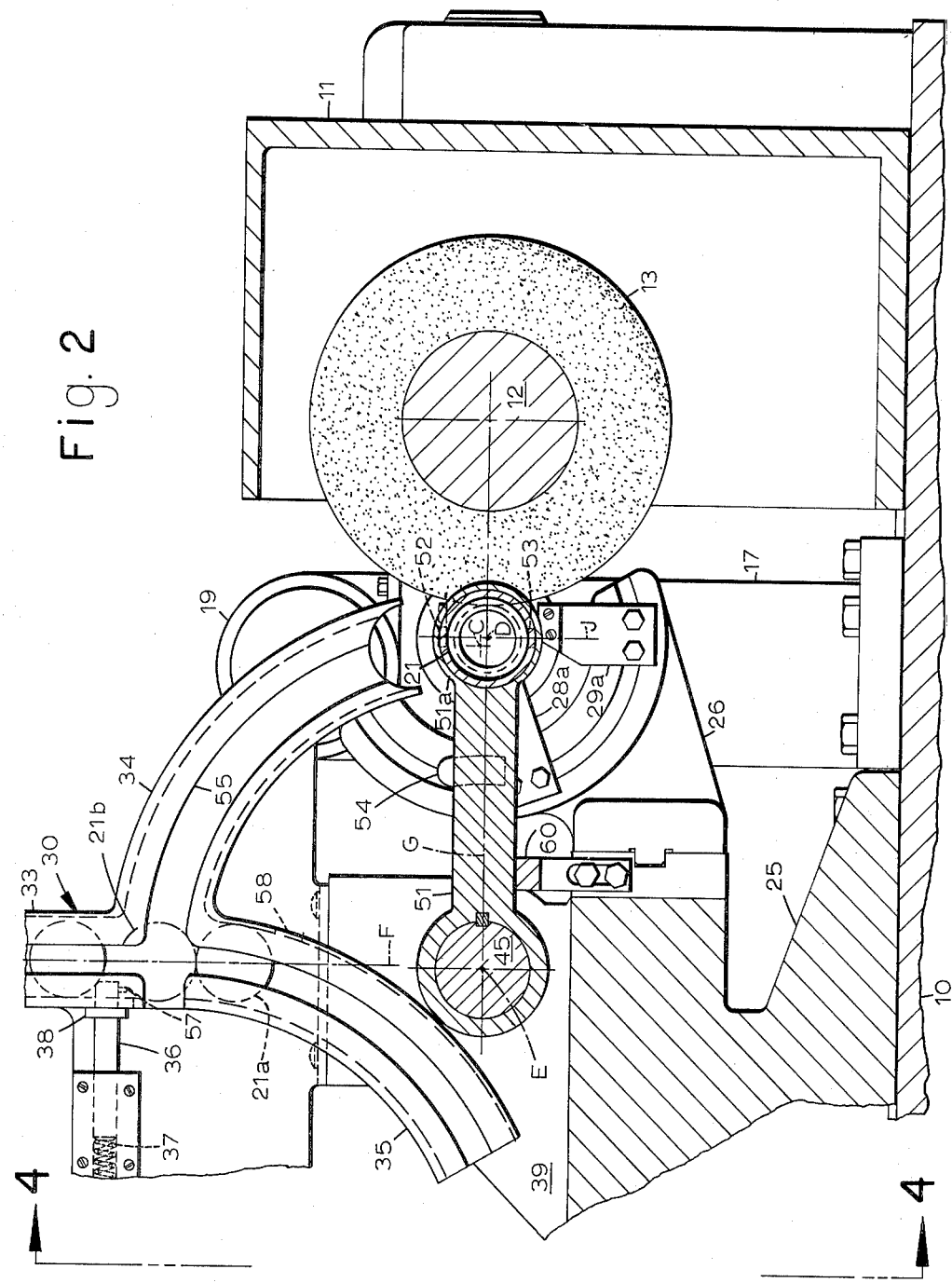

In the drawings:

FIG. 1 is a plane view of a dual operating grinding machine with the loading mechanism of the present invention;

FIGS. 2 and 3 are views taken on the lines 2—2 and 3—3, respectively, of FIG. 1;
FIG. 4 is a view taken on the line 4—4 of FIG. 2; and
FIG. 5 is a view taken on the line 5—5 of FIG. 4.

There is shown in the drawings a grinding machine having a base 10 on which a wheelhead 11 is mounted. As shown best in FIG. 1, a horizontal spindle 12, journaled in the wheelhead, carries two spaced grinding wheels 13, 14 (in vertical planes A and B, respectively) and is rotated by wheelhead motor 15 through belts 16. Two headstocks, 17 and 18, are mounted on the base and each has a horizontal spindle on axis C, driven by motor 19. The horizontal spindles each terminate in a magnetic end face 20. The headstock 17 is positioned with end face 20 adjacent plane A so that a workpiece 21 magnetically gripped by the end face is rotated thereby in plane A for a grinding operation by grinding wheel 13. The headstock 18 is positioned with end face 20 adjacent plane B so that a workpiece 21 magnetically gripped by the end face is rotated thereby in plane B for a grinding operation by grinding wheel 14.

A support 25 is mounted on the base 10 and has two spaced support arms 26, 27 mounted thereon. Support arm 26 has a pair of shoe supports 28a, 29a, connected thereto, which carry shoes 28, 29 as shown in FIG. 3. The shoes 28, 29 lie in plane A and support workpiece 21 therein with its central axis on a horizontal axis D, slightly displaced from the axis C of the headstock spindles and end faces 20 thereof, for a grinding operation by grinding wheel 13. Thus, as the end face 20 grips a workpiece 21, the workpiece is urged into the shoes for location in an operating position by the shoes (which define an operating station) and the workpiece is rotated in the operating position by the rotating end face. Similarly, support arm 27 has a pair of shoes connected thereto, lying in plane B, which support a workpiece in that plane with its central axis on axis D for a grinding operation by grinding wheel 14.

Two chutes, 30 and 31, are mounted on the support 25 by brackets 32, chute 30 lying in plane A and chute 31 lying in plane B. Each chute comprises an upper vertical portion 33, an adjoining circular portion 34, and a lower vertical portion 35. A detent 36 extends into the upper vertical chute portion immediately above the adjoining circular chute portion 34. The detent is urged into chute portion 33 by spring 37 to a position where collar 38 engages the chute portion. In this inner extreme position of the detent, workpieces are held in the upper vertical chute portion 33. The chute portion 34 is in the form of a circular arc having a center on horizontal axis E which is at the intersection of a vertical plane F and a horizontal plane G. Vertical plane F passes through the center of upper vertical chute portions 33 (and through the central axes of workpieces 21 held therein) and horizontal plane G passes through the central axis of workpieces 21 supported by shoes 28, 29. Chute portion 34, which connects to upper vertical chute portion just below detent 36, terminates directly over the shoes 28, 29. The lower vertical chute portion 35, which descends into a well 39 in the support 25, curves away from the wheelhead for the discharge of finished workpieces.

The support 25 has a horizontal shaft 45 extending therethrough which has a pinion 46 thereon. Pinion 46 is engaged with rack 47 on a piston 48 slidably received in cylinder 49. The piston 48 and cylinder 49 define a motor 50 which oscillates shaft 45 when fluid under pressure is alternately supplied to one end of the cylinder and the other end thereof. An arm 51 is keyed to shaft 45 to swing between a vertical position (in plane F) and a horizontal position (in plane G). The arm is positioned on shaft 45 to swing in a vertical plane H, parallel to, and midway between, planes A and B. The outer end 51a of the arm has, on each side, two fingers 52, 53 lying on a line J perpendicular to the arm, the fingers spaced apart on that line to embrace a workpiece 21 therebetween. The arm also has, on each side, a finger, or projection, 54 which extends through slot 58 into the lower chute portion 35 as the arm swings to the vertical position.

In operation of the loading mechanism of the present invention, the arm 51 is swung from the vertical, or transfer, position to the horizontal, or grinding, position by motor 50. The fingers 52, 53 on each side of the arm extend into arcuate slots 55 in the inner sides of circular chute portions 34 to straddle a workpiece therein. The arm carries two workpieces simultaneously down to the two pairs of shoes 28, 29. The arm is arrested by stop 60 after the workpiece is engaged by the shoes so that the fingers on the arm offer no support to the workpieces during grinding. The arm 51 remains in the horizontal position (as shown in FIG. 2) as the wheelhead 11 advances to bring the two grinding wheels 13 and 14 into abrading contact with the two workpieces held in the operating stations by the shoes. At this time, there are no workpieces in chute portions 34 and 35, but unoperated workpieces are held in the upper vertical chute portion 33 by detent 36. When the grind on the two workpieces is completed and the wheelhead 11 retracts to retract the two grinding wheels 13 and 14, the motor 50 is reversed to swing the arm toward the vertical position. On each side of the arm, the fingers 52, 53 which embrace the two finished workpieces, lift these workpieces into the two circular chute portions 34, respectively.

As the arm 51 approaches the vertical position, an abutment surface 56 on each finger 52 engages a lug 57 on detent 36 to push the detent out of chute portion 33. At the same time, the finger projection 54 on each side of the arm enters the opening 58 in lower chute portion 35.

When the arm 51 reaches the vertical, or transfer, position, the finished workpieces drop into the lower vertical chute portions 35 but are stopped therein (at the positions indicated at 21a) by the fingers 54. At the same time, the detents (which are pushed completely out of chute portions 33 when the arm 51 reaches the vertical position) releases two workpieces. These unoperated workpieces drop but are stopped (between fingers 52, 53) at the positions indicated at 21b by the finished workpieces held at positions 21a.

The motor 50 is again reversed and arm 51 swings clockwise, carrying the two unoperated workpieces from the positions at 21b into the circular chute portions 34. As the arm swings away from the vertical position (and after the two unoperated workpieces are in chute portions 34) the finished workpieces are released by finger projections 54 to drop out of chute portions 35.

What is claimed is:

1. In a grinding machine having two spaced operating stations, a swingable arm having an outer end movable in a circular arc into a position between said operating stations as the arm is swung, and means to hold a workpiece on each side of the arm at its outer end for simultaneous delivery of workpieces into said operating stations as said outer end of the arm moves into said position between the operating stations.

2. In a grinding machine having two spaced operating stations, a swingable arm having an outer end movable in a circular arc into a position between said operating stations as the arm is swung, said arm having fingers at said outer end extending laterally from each side of the arm to carry a workpiece into each of said operating stations as the outer end of the arm moves into said position between said operating stations.

3. In a grinding machine having two operating stations at which two workpieces are held, respectively, in spaced parallel planes for a grinding operation, the combination comprising a chute portion extending along a circular arc in each of said planes, each of said chute portions terminating adjacent the operating stations and the centers of said arcs lying on a common axis, an arm swingable about said axis and having an outer end movable between said chutes to a position between said operating stations as the arm is swung, said arm having fingers at said outer end extending laterally from both sides of the arm into the chute portions to carry a workpiece through each chute portion into said operating stations.

4. In a grinding machine having two pairs of shoes on which two workpieces are held, respectively, in spaced parallel planes for a grinding operation, the combination comprising a vertical chute portion and an adjoining chute portion in each of said planes, each of said adjoining chute portions extending along a circular arc and terminating above a pair of shoes, the centers of said arcs lying on a common axis below said vertical chute portions and beside the pairs of shoes, an arm swingable about said axis and having an outer end movable between said adjoining chute portions to a position between said pairs of shoes as the arm is swung, said arm having a pair of fingers at said outer end extending laterally from each side of the arm into one of said adjoining chute portions, the pair of fingers on each side of the arm receiving a workpiece from the vertical chute portion and carrying a workpiece through the adjoining chute portion onto a pair of said shoes.

5. In a grinding machine having two pair of shoes on which two workpieces are held, respectively, in spaced parallel planes for a grinding operation, the combination comprising a vertical chute portion and an adjoining chute portion in each of said planes, each of said adjoining chute portions extending along a circular arc and terminating above a pair of shoes, the centers of said arcs lying on a common axis below said vertical chute portions and beside the pairs of shoes, an arm swingable about said axis between a vertical and horizontal position in an intermediate plane parallel to and between the planes of the shoes, said arm having an outer end movable between said adjoining chute portions from a position between the vertical chute portions to a position between the pairs of shoes as the arm swings from a vertical to a horizontal position, said arm having a pair of fingers at said outer end extending laterally from each side of the arm, said fingers spaced apart on a line perpendicular to the arm and extending into said adjoining chute portions to straddle a workpiece, the pairs of fingers on each side of the arm receiving a workpiece from the vertical chute portion, and means to swing the arm from the vertical to the horizontal position to carry a pair of workpieces onto the shoes and to swing the arm from the horizontal to the vertical position to carry the pair of workpieces back to the vertical chute portions.

6. In a grinding machine having two spaced operating stations and two vertically extending chute portions spaced from said operating stations, a swingable arm having an outer end movable from a transfer position between said vertical chute portions to a grinding position between said operating stations, said outer end of the arm having portions extending laterally therefrom to engage workpieces for transporting a pair of unground workpieces from the vertical chute portions to the operating stations and for transporting a pair of ground workpieces from the operating stations to the vertical chute portions, a detent extending into each vertical chute portion above the transfer position to hold workpieces, said detents retractable to release a pair of workpieces to the laterally extending arm portions as the arm reaches the transfer position, and means on the arm extending into each chute portion below the transfer position when the outer end of the arm is in the transfer position to engage a pair of ground workpieces released from the arm for support in the transfer position of a pair of unground workpieces released from the detent.

7. In a grinding machine having two pair of shoes on which two workpieces are held, respectively, in spaced parallel planes for a grinding operation, the combination comprising a vertical chute portion and an adjoining chute portion in each of said planes, each of said vertical chute portions having a detent therein to hold workpieces above the adjoining chute portions and each of said adjoining chute portions extending along a circular arc and terminating above a pair of shoes, the centers of said arcs lying on a common axis below said vertical chute portions and beside the pairs of shoes, an arm swingable about said axis between a vertical and horizontal position in an intermediate plane parallel to and between the planes of the shoes, said arm having an outer end movable between said adjoining chute portions from a position between the vertical chute portions to a position between the pairs of shoes as the arm swings from a vertical to a horizontal position, said arm having an abutment surface on each side of the outer end to engage the detent and release a workpiece therefrom as the outer end of the arm moves between the vertical chute portions, said arm having a pair of fingers at said outer end extending laterally from each side of the arm, said fingers of each pair spaced apart on a line perpendicular to the arm and extending into said adjoining chute portions to straddle a workpiece, the pairs of fingers on each side of the arm receiving a workpiece from the detent, means to swing the arm from the vertical to the horizontal position to carry a pair of workpieces onto the shoes for an operation thereon and to swing the arm from the horizontal to the vertical position to carry the workpieces back to the vertical chute after the operation thereon, a projection on each side of the arm extending into the vertical chute portion below the adjoining chute portion as the arm swings to the vertical position to hold finished workpieces for support of the workpieces released from the detents.

References Cited by the Examiner
UNITED STATES PATENTS 2,884,747   5/1959   Lehman _____ 51—215

ROBERT C. RIORDON, *Primary Examiner.*

LEONARD S. SELMAN, *Examiner.*